(12) United States Patent
Hasuike

(10) Patent No.: US 8,482,483 B2
(45) Date of Patent: Jul. 9, 2013

(54) DISPLAY CONTROL DEVICE, DISPLAY, DISPLAY SYSTEM AND COMPUTER-READABLE MEDIUM

(75) Inventor: Kimitake Hasuike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 989 days.

(21) Appl. No.: 11/984,185

(22) Filed: Nov. 14, 2007

(65) Prior Publication Data

US 2008/0238954 A1    Oct. 2, 2008

(30) Foreign Application Priority Data

Mar. 29, 2007    (JP) ................................. 2007-086656

(51) Int. Cl.
*G09G 5/00* (2006.01)

(52) U.S. Cl.
USPC ........................................... 345/2.2; 345/1.1

(58) Field of Classification Search
USPC .................................................. 345/1.1, 2.2
See application file for complete search history.

(56) References Cited

U.S. PATENT DOCUMENTS

| | | | |
|---|---|---|---|
| 5,745,711 A | 4/1998 | Kitahara | |
| 5,805,243 A | 9/1998 | Hatano et al. | |
| 5,826,962 A * | 10/1998 | Rodriguez, Jr. | 353/82 |
| 5,853,327 A * | 12/1998 | Gilboa | 463/39 |
| 5,995,095 A | 11/1999 | Kitahara et al. | |
| 6,741,977 B1 | 5/2004 | Nagaya et al. | |
| 6,986,583 B2 | 1/2006 | Nishio et al. | |
| 7,134,756 B2 * | 11/2006 | Drucker et al. | 353/77 |
| 7,432,876 B2 * | 10/2008 | Okuley | 345/1.1 |
| 7,446,731 B2 * | 11/2008 | Yoon | 345/2.2 |
| 7,453,418 B2 * | 11/2008 | Palmquist | 345/1.1 |
| 7,474,983 B2 * | 1/2009 | Mazalek et al. | 702/150 |
| 7,641,348 B2 * | 1/2010 | Yin et al. | 353/119 |
| 2001/0044858 A1 | 11/2001 | Rekimoto | |
| 2005/0188306 A1 | 8/2005 | Mackenzie | |
| 2006/0149495 A1 | 7/2006 | Mazalek et al. | |
| 2007/0046983 A1 | 3/2007 | Hull et al. | |
| 2008/0238948 A1 | 10/2008 | Mishima | |
| 2009/0063542 A1 | 3/2009 | Bull et al. | |

FOREIGN PATENT DOCUMENTS

| | | |
|---|---|---|
| JP | A-06-332819 | 12/1994 |
| JP | A-09-319556 | 12/1997 |
| JP | A-2001-136504 | 5/2001 |
| JP | A-2001-175374 | 6/2001 |

(Continued)

OTHER PUBLICATIONS

U.S. Appl. No. 11/984,181, filed Nov. 14, 2007, Yu Mishima.

(Continued)

*Primary Examiner* — Chanh Nguyen
*Assistant Examiner* — Roy Rabindranath
(74) *Attorney, Agent, or Firm* — Oliff & Berridge, PLC

(57) ABSTRACT

A display control device includes a position specifying unit, an image specifying unit and a controller. The position specifying unit specifies a position of a second apparatus on a display screen of a first apparatus. The image specifying unit specifies one of an image displayed on a display screen of the second apparatus and an image that is designated from among two or more images displayed on the display screen of the second apparatus. The controller controls such that a certain image according to the image specified by the image specifying unit is displayed at a certain position on the display screen of the first apparatus according to the position of the second apparatus specified by the position specifying unit.

15 Claims, 15 Drawing Sheets

FOREIGN PATENT DOCUMENTS

| | | |
|---|---|---|
| JP | A-2002-204239 | 7/2002 |
| JP | A-2004-164069 | 6/2004 |
| JP | A-2005-031448 | 2/2005 |
| JP | A-2005-100050 | 4/2005 |
| JP | A-2006-072071 | 3/2006 |
| JP | A-2006-202016 | 8/2006 |
| JP | A-2008-243125 | 10/2008 |

OTHER PUBLICATIONS

Sep. 10, 2010 Office Action issued in U.S. Appl. No. 11/984,181.

Mar. 4, 2011 Office Action issued U.S. Appl. No. 11/984,181.

Wellner, Pierre, "Interacting with Paper on the DigitalDesk", Communication of the ACM, Jul. 1993, vol. 36, No. 7, pp. 87-96.

Holman et al., "PaperWindows: Interaction Techniques for Digital Paper", CHI 2005, Papers: Physical Interaction, Apr. 2-7, 2005, pp. 591-599.

Sep. 12, 2011 Office Action issued in corresponding U.S. Appl. No. 11/984,181.

Japanese Office Action issued in Japanese Application No. 2007-086630 dated Dec. 6, 2011 (w/ English Translation).

Toshifumi Arai "Desk Type Dialog Environment Reacting an Operation in the Real World," Computer Software, May 15, 1996, 13-3, pp. 19-27, Japan.

English-language translation of Jun. 12, 2012 Office Action issued in Japanese Patent Application No. 2007-086656.

Nov. 20, 2012 Office Action issued in Japanese Patent Application No. 2012-178737 (with English translation).

Nov. 20, 2012 Office Action issued in Japanese Patent Application No. 2007-086656 (with English translation).

Shiozawa et al., "Collaborative Workspace Visualization Using Background and Perspective", Transactions of Information Processing Society of Japan, Nov. 1999, vol. 40, No. 11, pp. 3823-3833, Information Processing Society of Japan, Japan. (with English translation).

Ishizaki et al., "Data Exchange between Application Programs in Real-Time CSCW Systems", Study Report of Information Processing Society of Japan, Jan. 1993, vol. 93, No. 12, pp. 73-79, Information Processing Society of Japan, Japan. (with English translation).

\* cited by examiner

*FIG. 2A*

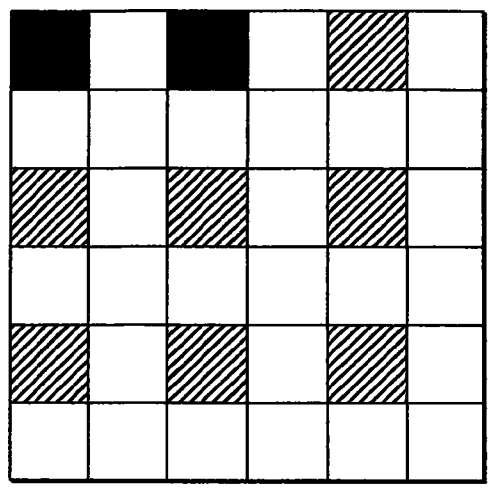

*FIG. 2B*

| SYNCHRO-NOUS CODE 2 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
|---|---|---|---|---|
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| IDENTIFI-CATION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |

FIG. 4A

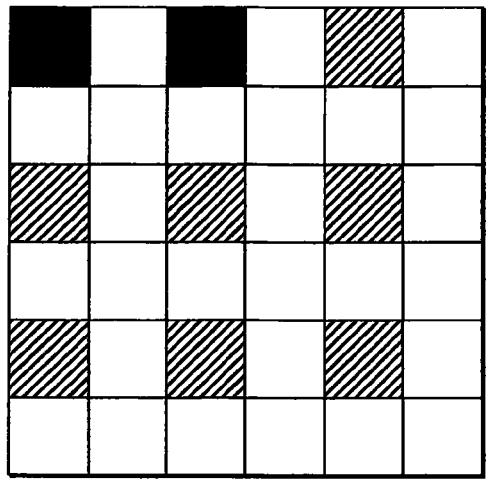

FIG. 4B

| SYNCHRO-NOUS CODE 2 BITS | X POSITION CODE 5 BITS | X POSITION CODE 5 BITS | X POSITION CODE 5 BITS | X POSITION CODE 5 BITS |
|---|---|---|---|---|
| Y POSITION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| Y POSITION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| Y POSITION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |
| Y POSITION CODE 5 BITS | IDENTIFI-CATION CODE 5 BITS | IDENTIFI-CATION CODE 5 BITS | IDENTIFI-CATION CODE 5 BITS | IDENTIFI-CATION CODE 5 BITS |

| HORIZONTAL ID | PORTABLE ID | PORTABLE POSITION | DOCUMENT ID |
|---|---|---|---|
| P001 | Q001 | (A1x, A1y), (B1x, B1y), (C1x, C1y) | R001 |
| P001 | Q002 | (A2x, A2y), (B2x, B2y), (C2x, C2y) | R002 |
| P002 | Q003 | (A3x, A3y), (B3x, B3y), (C3x, C3y) | R003 |
| P002 | Q004 | (A4x, A4y), (B4x, B4y), (C4x, C4y) | R004 |
| ⋮ | ⋮ | ⋮ | ⋮ |

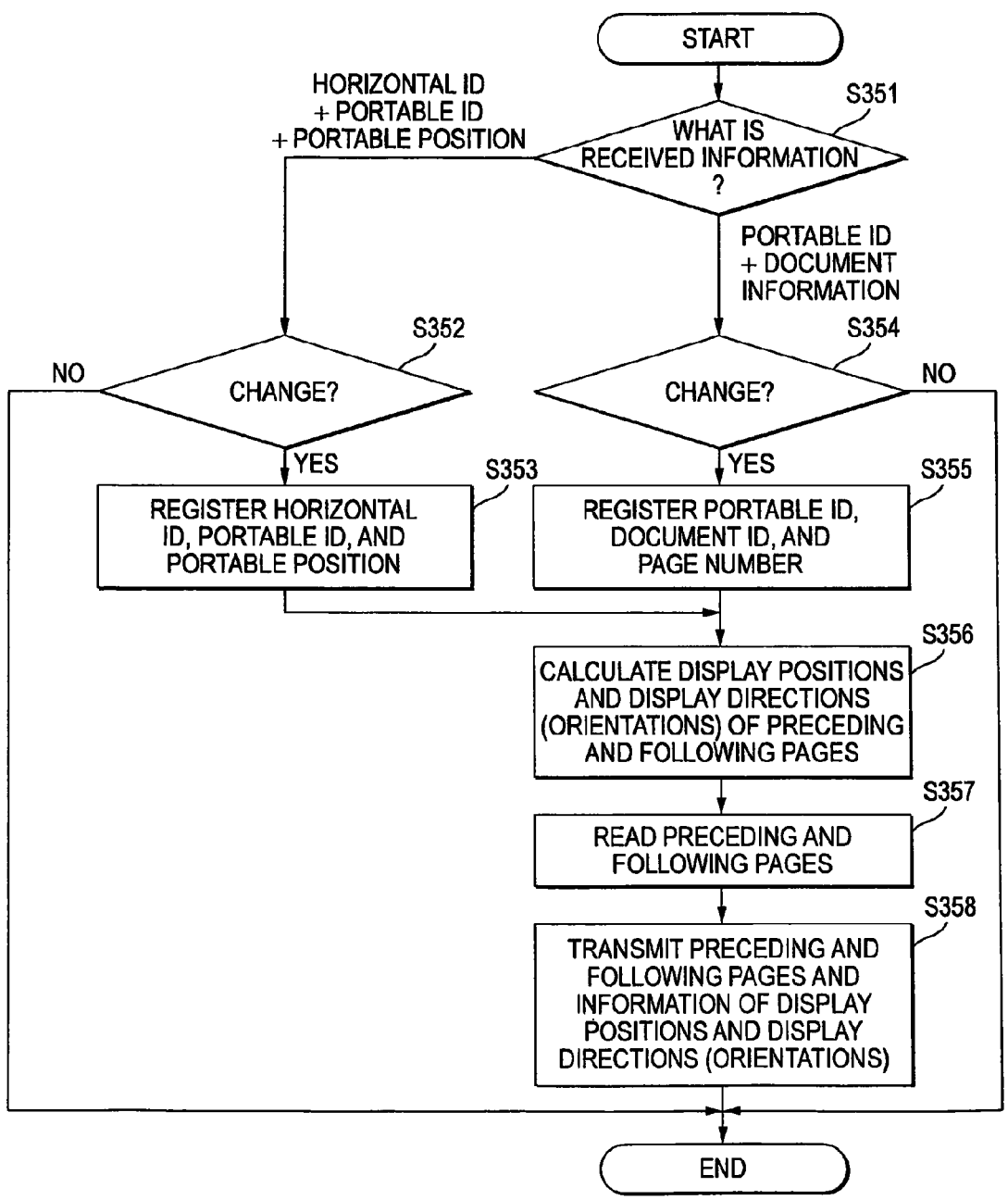

FIG. 14

| HORIZONTAL ID | PORTABLE ID | PORTABLE POSITION | DOCUMENT ID | PAGE |
|---|---|---|---|---|
| P001 | Q001 | (A1x, A1y), (B1x, B1y), (C1x, C1y) | R001 | 1 |
| P001 | Q002 | (A2x, A2y), (B2x, B2y), (C2x, C2y) | R002 | 3 |
| P002 | Q003 | (A3x, A3y), (B3x, B3y), (C3x, C3y) | R003 | 10 |
| P002 | Q004 | (A4x, A4y), (B4x, B4y), (C4x, C4y) | R004 | 2 |
| ⋮ | ⋮ | ⋮ | ⋮ | ⋮ |

DISPLAY CONTROL DEVICE, DISPLAY, DISPLAY SYSTEM AND COMPUTER-READABLE MEDIUM

CROSS-REFERENCE TO RELATED APPLICATIONS

This application is based on and claims priority under 35 U.S.C. §119 from Japanese Patent Application No. 2007-86656 filed Mar. 29, 2007.

BACKGROUND

Technical Field

The invention relates to a display control device, a display, a display system, and a computer-readable medium.

SUMMARY

According to an aspect of the invention, a display control device includes a position specifying unit, an image specifying unit and a controller. The position specifying unit specifies a position of a second apparatus on a display screen of a first apparatus. The image specifying unit specifies one of an image displayed on a display screen of the second apparatus and an image that is designated from among two or more images displayed on the display screen of the second apparatus. The controller controls such that a certain image according to the image specified by the image specifying unit is displayed at a certain position on the display screen of the first apparatus according to the position of the second apparatus specified by the position specifying unit.

BRIEF DESCRIPTION OF THE DRAWINGS

Exemplary embodiments of the invention will be described in detail below with reference to the accompanying drawings, wherein:

FIG. 2 is a drawing to show an example of a code image used in the first example;

FIG. 4 is a drawing to show an example of a code image used in the second example;

FIG. 13 is a flowchart to show a second operation example of the display system in the exemplary embodiment of the invention;

FIG. 14 is a drawing to show management information used in the second operation example.

DETAILED DESCRIPTION

The exemplary embodiment(s) of the invention will be described in detail with reference to the accompanying drawings.

In the exemplary embodiment, a horizontal display for plural users to have a discussion with gathering about the display is used as an example of a display. A portable display carried in by one user is placed on the horizontal display and an electronic document displayed on the portable display is shared on a shared screen on the horizontal display, to thereby have a discussion. Then, first the mechanisms of the horizontal display and the portable display will be described.

To begin with, a first example of the mechanisms of the horizontal display and the portable display will be described.

Figure 1:
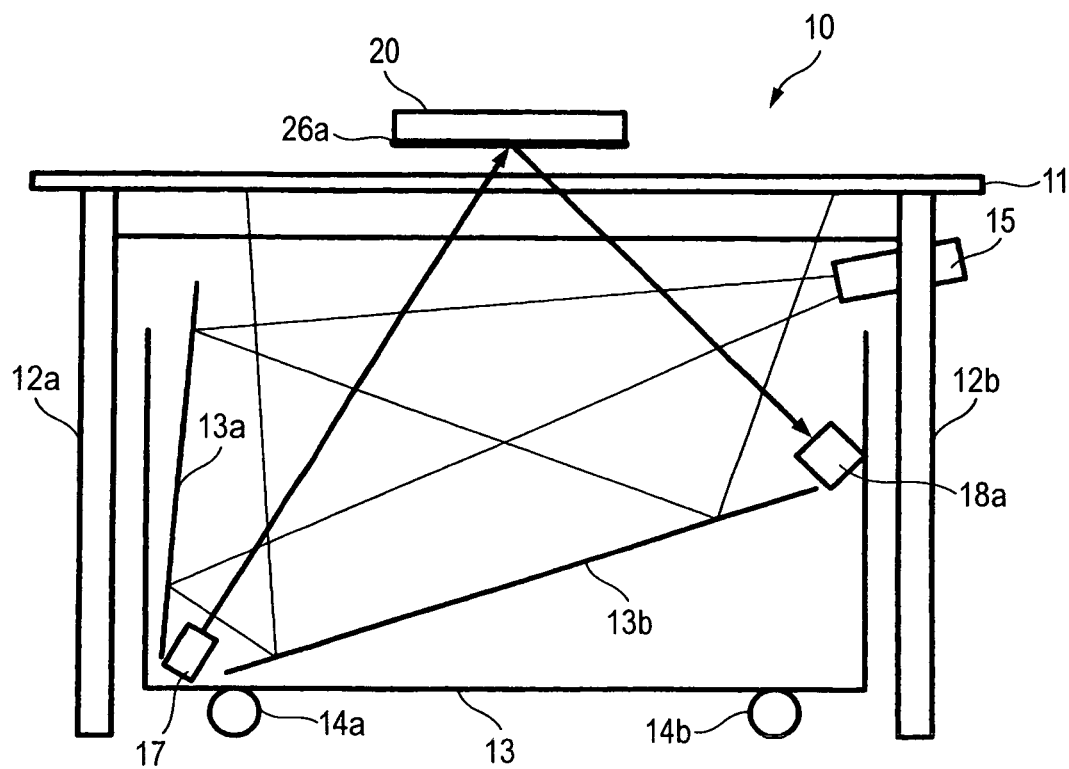
FIG. 1 is a drawing to show a first example of a horizontal display and a portable display to which an exemplary embodiment of the invention is applied.

FIG. 1 is a section view when a portable display 20 is placed on a horizontal display 10 in the first example. Usually, the portable display 20 is in contact with the horizontal display 10, but a gap is provided between the horizontal display 10 and the portable display 20 in the figure for ease to view.

As shown in the figure, the horizontal display 10 includes a top plate 11 as a workbench for having a discussion, and leg portions 12a to 12d for supporting the top plate 11. The horizontal display 10 also includes a projection unit 13 for projecting an image onto the top plate 11 from its rear, casters 14a to 14d for movably supporting the projection unit 13, and a projector 15 for projecting the image to be projected onto the top plate 11. The horizontal display 10 further includes an infrared light source 17 for irradiating the bottom surface of the portable display 20 with infrared light and an infrared camera 18a for receiving the infrared light reflected on the bottom of the portable display 20. However, FIG. 1 is a section view and therefore the legs portions 12c and 12d and the casters 14c and 14d do not appear in the figure.

The top plate 11 is circular, for example, so that each user can participate in discussion with standing at any desired position in the surrounding of the top plate 11. For example, a translucent white filter is put on a base material of a glass plate, etc., to form a transmission-type screen so that the top plate 11 functions as a display screen (for example, large screen display) for displaying an image projected by the projection unit 13. That is, in the exemplary embodiment, the top plate 11 is used as an example of a display unit. Further, the top plate 11 also includes a function of a touch panel for detecting user's operation on the displayed image. The touch panel may be provided by covering the surface of the top plate 11 with a transparent screen where elements for detecting contact are placed or may be provided by running infrared light vertically and horizontally on the surface of the top plate 11 and detecting a position where the infrared is blocked. In the exemplary embodiment, however, the portable display 20 may be placed on the top plate 11 as shown in the figure. Therefore, it is assumed that the function of the touch panel of the top plate 11 is a function of discriminating between touch with the bottom surface of the portable display 20 and touch as user's operation, for processing. For example, if the touch part exceeds a given area, a signal representing user's operation may be suppressed.

The number of the legs (12a to 12d) is four by way of example, but is not limited to four.

The projection unit 13 is formed of a square pole box with a side surface of the top plate 11 being open and contains mirrors 13a and 13b therein. It is assumed that the mirrors 13a and 13b are fixed at angles as shown in the figure and are attached to side surfaces of the box of the projection unit 13.

The casters 14a to 14d are attached to the bottom surface of the projection unit 13 so that the projection unit 13 can be moved with a move of a table made up of the top plate 11, the leg portions 12a to 12d, and the projector 15. However, the relative position of the projection unit 13 to the table is prevented from shifting. The number of the casters is four, but is not limited to four.

The projector 15 is hung from the top plate 11 and is fixed and projects an image in the direction of the mirror 13a. Then, the image is reflected on the mirror 13a and is projected onto the top plate 11.

The infrared light source 17 blinks in a pulse fashion in synchronization with the shutter timing of the infrared camera 18a, for example. Accordingly, an area of the top plate 11 where there is a possibility that the portable display 20 may be placed is irradiated with the infrared light on a regular basis. For example, an infrared LED may be used as the infrared light source 17.

The infrared camera 18a captures an image of the bottom surface of the portable display 20, with which infrared light is irradiated, by an image sensor having sensitivity to the infrared region. The captured image is analyzed. Thereby, an ID and a position of the portable display 20 are detected. For example, a CMOS sensor or a CCD sensor may be used as the image sensor.

In the exemplary embodiment, an image is thus read with the infrared light, so that video produced by visible light of the projector 15 is not affected. To conduct further reliable projection and ID recognition, a holographic optical element for allowing any other than light at a given angle to pass through may be used in the top plate 11. Alternatively, a method of putting a film, which is electrically changeable between transmission and non-transmission, on the top plate 11 and switching between projection and ID recognition in a short cycle may also be adopted.

On the other hand, the portable display 20 may any so long as it is a portable-type terminal. A notebook PC is a representative example; a PDA (Personal Digital Assistant), a digital camera, a mobile telephone, etc., may be adopted. It is noted that a code image 26a formed of a color material (for example, toner) having an absorption region in the infrared region is put on the bottom surface of the portable display 20 so that the ID and the position of the portable display 20 are detected using the infrared light source 17 and the infrared camera 18a.

FIG. 2 is a drawing to show an example of an image forming the code image 26a.

First, unit patterns forming the code image 26a will be described.

FIG. 2A shows an example of a unit pattern.

The unit pattern refers to the minimum unit of embedded information. In the figure, black regions and hatched regions are regions where dot can be placed and white regions existing therebetween is regions where a dot cannot be placed. Dots are placed in the black regions of the regions where dot can be placed; dots are not placed in the hatched regions. That is, the figure shows an example in which a unit pattern is formed by placing dots in two positions selected from among the nine positions where dot can be placed. Here, the number of combinations of selecting two positions from among nine positions is equal to 36 ($=_9C_2$) and therefore, 36 types of unit patterns exist. Among them, the four types of unit patterns are used as synchronous patterns. The synchronous patterns are patterns to detect image rotation and specify a relative position of an identification code. Particularly, since it is necessary to detect image rotation, selected as the four types of unit patterns are patterns such that if one of the synchronous patterns is rotated 90 degrees, it becomes another of the synchronous patterns are selected. The 32 types of unit patterns except the four types of unit patterns are used as information patterns representing an identification code, to represent five-bit information.

By the way, the dots shown in FIG. 2A are dots for representing information and do not necessarily match a dot meaning the minimum point forming a part of an image. In the exemplary embodiment, the dot for representing information (minimum square in FIG. 2A) has a size of two dots×two dots in 600 dpi. Since the size of one dot in 600 dpi is 0.0423 mm, one side of the dot for representing information (minimum square in FIG. 2A) is 84.6 μm (=0.0423 mm×2). The dot for representing information may be small as much as possible because the larger the dot becomes, the more conspicuous the dot becomes. However, if the dot is made too small, it cannot be printed by a printer. Then, the above-mentioned value falling within a range of from 50 μm to 100 μm is adopted as the size of the dot for representing information. However, the above-mentioned value 84.6 μm is a numeric value on calculation and the size becomes about 100 μm in an actually printed toner image.

Next, a code block made up of such unit patterns will be described.

FIG. 2B shows an example of layout of a code block. Here, the figure shows a code array just before replacement with a pattern image rather than an image. That is, a unit pattern (any of 36 types of unit patterns) as in FIG. 2A is placed in the minimum square in FIG. 2B (which will be hereinafter referred to as "unit block") and the resultant image is formed on a medium.

In the layout in FIG. 2B, a synchronous code is placed in one unit block in the upper left corner of the code block. An identification code is placed in four unit blocks to the right of the unit block in which the synchronous code is placed and in four unit blocks below the unit block in which the synchronous code is placed. Furthermore, the identification code is placed in 16 (=4×4) unit blocks surrounded by these unit blocks.

In the exemplary embodiment, the ID of the portable display 20 is coded and used as the identification code in the code image 26a. In so doing, if the image captured by the infrared camera 18a is analyzed, the ID of the portable display 20 is obtained and also it is possible to find which portable display 20 is placed on the horizontal display 10.

On the other hand, the position of the portable display 20 on the horizontal display 10 is found based on the position and the size of the code image in the image captured by the infrared camera 18a. For example, if the code image exists on the upper side in the image captured by the infrared camera 18a, it can be found that the infrared light is received from roughly above in the vertical direction. More specifically, it is assumed that an image is captured so that one side of the infrared camera 18a closer to a table surface is on an upper side of the captured image. In this case, if the portable display 20 is located on the optical axis, the code image appears at the center of the captured image; if the portable display 20 is closer to the infrared camera 18a than the optical axis, the code image appears in the upper portion of the captured image; and if the portable display 2 is farther from the infrared camera 18a than the optical axis, the code image appears in the lower portion of the captured image. If the code image exists on the lower side in the image captured by the infrared camera 18a, it can be found that the infrared light is received from a direction closer to the horizontal direction than the vertical direction. The size of the code image 26a is determined in advance and is compared with the size of the code image in the image captured by the infrared camera 18a. Thereby, a distance from the infrared camera 18a to the code image 26a is recognized. Then, the position of the portable display 20 in a three-dimensional space is determined from the found direction and distance K (black containing carbon) toner and special toner are available as the toner used to form the code image 26a.

As the special toner, invisible toner having the maximum absorption ratio in a visible light region (400 nm to 700 nm) being 7% or less and the absorption ratio in a near-infrared region (800 nm to 1000 nm) being 30% or more is illustrated. However, "visible" and "invisible" do not have a bearing on whether or not the toner (code image) can be recognized by human's eyes. "Visible" and "invisible" are distinguished depending on whether or not the code image can be recognized according to the presence or absence of color development property due to absorption of a specific wavelength in the visible light region. If the toner (code image) is hard to recognize with human's eyes although there is some color development property due to absorption of the specific wavelength in the visible light region, it is also contained in "invisible."

Next, a second example of the mechanisms of the horizontal display and the portable display will be described.

Figure 3:
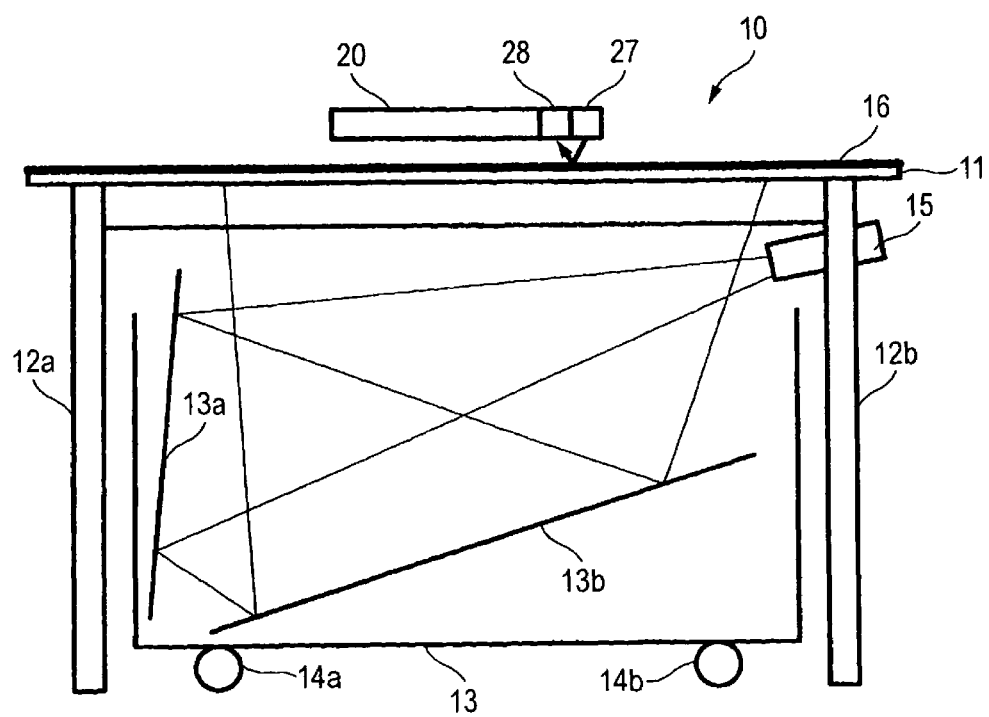
FIG. 3 is a drawing to show a second example of a horizontal display and a portable display to which the exemplary embodiment of the invention is applied.

FIG. 3 is a section view when a portable display 20 is placed on a horizontal display 10 in the second example. A gap is also provided between the horizontal display 10 and the portable display 20 in this figure for ease to view.

As shown in the figure, the horizontal display 10 includes a top plate 11, leg portions 12a to 12d, a projection unit 13 containing mirrors 13a and 13b, casters 14a to 14d, and a projector 15, which are similar to those of the horizontal display 10 shown in FIG. 1 and therefore will not be described again.

By the way, in FIG. 1, the horizontal display 10 reads the code image retained by the portable display 20; whereas, in FIG. 3, the portable display 20 reads a code image retained by the horizontal display 10. That is, in FIG. 3, the portable display 20 may be a notebook PC, etc., as in FIG. 1, but includes an infrared light source 27 and an infrared camera 28 in place of the code image 26a. The functions of the infrared light source 27 and the infrared camera 28 are the same as the functions of the infrared light source 17 and the infrared camera 18a in FIG. 1 and therefore will not be described again.

On the other hand, the horizontal display 10 does not include the infrared light source 17 or the infrared camera 18a. Instead, a code image 16 formed with a color material (for example, toner) having an absorption region in the infrared region is put on the surface of the top plate 11 so that an ID and a position of the horizontal display 10 are detected using the infrared light source 27 and the infrared camera 28.

FIG. 4 is a drawing to show an example of an image, etc., forming the code image 16.

FIG. 4A shows an example of a unit pattern forming the code image 26a, but it is similar to that previously described with reference to FIG. 2A and therefore will not be described again. In FIG. 2A, information patterns other than the synchronous pattern among the unit patterns are described as those only representing an identification code. However, in FIG. 4, they represent not only the identification code, but also a position code as described later.

Next, a code block formed of such unit patterns will be described.

FIG. 4B shows an example of layout of a code block. Here, this figure shows a code array just before it is replaced by a pattern image, rather than an image. That is, a unit pattern (any of 36 types of unit patterns) as in FIG. 4A is placed in the minimum square in FIG. 4B (which will be hereinafter referred to as a "unit block") and the resultant image is formed on a medium.

In the layout in FIG. 4B, the synchronous code is placed in one unit block in the upper left corner of the code block. An X position code is placed in four unit blocks to the right of the unit block in which the synchronous code is placed. A Y position code is placed in four unit blocks below the unit block in which the synchronous code is placed. Further, an identification code is placed in 16 (=4×4) unit blocks surrounded by the unit blocks in which the position codes are placed.

In the exemplary embodiment, the ID of the horizontal display 10 is coded as the identification code in the code image 16. The coordinate positions on the horizontal display 10 are coded as the position codes in the code image 16. In so doing, if the image captured by the infrared camera 28 is analyzed, the ID of the horizontal display 10 and a coordinate position on the horizontal display 10 are obtained and it is made possible to find which position on which horizontal display 10 the portable display 20 is placed at.

As the toner used to form the code image 16, it is advisable to use a toner similar to that in FIG. 1.

Next, a third example of the mechanisms of the horizontal display and the portable display will be described.

Figure 5:
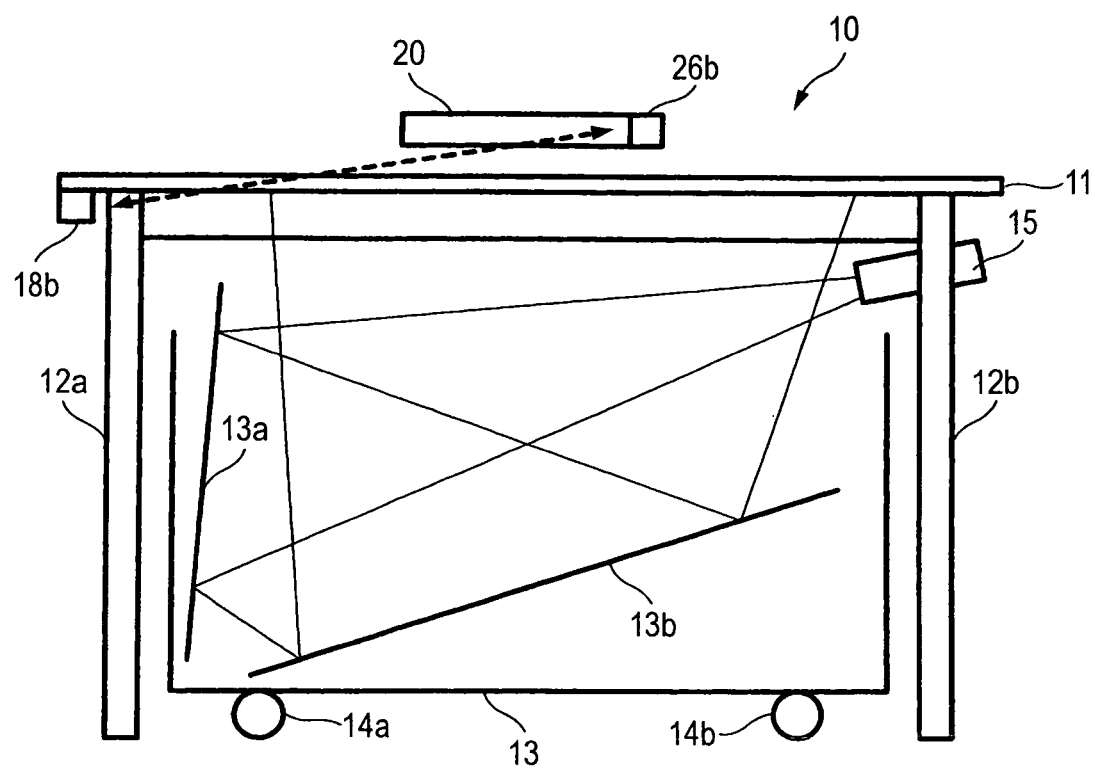
FIG. 5 is a drawing to show a third example of a horizontal display and a portable display to which the exemplary embodiment of the invention is applied.

FIG. 5 is a section view when a portable display 20 is placed on a horizontal display 10 in the third example. A gap is also provided between the horizontal display 10 and the portable display 20 in the figure for ease to view.

As shown in the figure, the horizontal display 10 includes a top plate 11, leg portions 12a to 12d, a projection unit 13 containing mirrors 13a and 13b, casters 14a to 14d, and a projector 15, which are similar to those of the horizontal display 10 shown in FIGS. 1 and 3 and therefore will not be described again.

By the way, in FIG. 1, the horizontal display 10 reads the information retained by the portable display 20 using infrared light. In FIG. 5, the horizontal display 10 reads the information retained by the portable display 20 by conducting wireless communications. That is, in FIG. 5, the portable display 20 may be a notebook PC, etc., as in FIG. 1, but includes a wireless sensor 26b in place of the code image 26a. On the other hand, the horizontal display 10 includes a transceiver 18b in place of the infrared light source 17 and the infrared camera 18a.

The wireless sensor 26b will be described.

Figure 6:
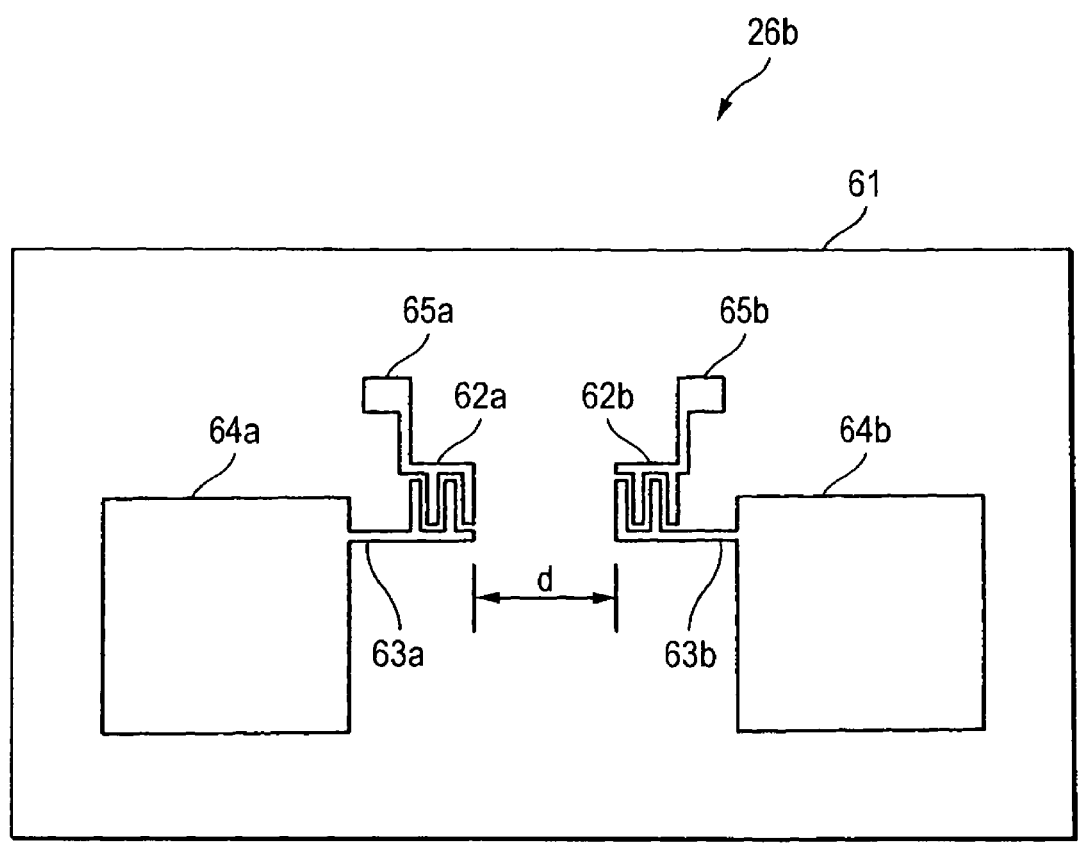
FIG. 6 is a drawing to show the configuration of a wireless sensor used in the third example.

FIG. 6 is a drawing to show the configuration of the wireless sensor 26b. The wireless sensor 26b includes: a dielectric thin film 61 formed, via an oxide film on a substrate made of Si for propagating a surface acoustic wave (SAW); and comb-shaped electrodes (IDT: Inter-digital Transducer) 62a and 62b formed on the dielectric thin film 61 for converting an electric signal into a surface acoustic wave and converting a surface acoustic wave into an electric signal. The wireless sensor 26b also includes: antennas 64a and 64b connected to the comb-shaped electrodes 62a and 62b through impedance matching parts 63a and 63b, respectively, for transferring a radio wave signal to and from the transceiver 18b; and grounds 65a and 65b connected to the other of the comb-shaped electrode 62a and 62b.

The comb-shaped electrode 62a and 62b, the antennas 64a and 64b, and the impedance matching parts 63a and 63b are formed of a conductive pattern in an integrated fashion. A material of the conductive pattern metal selected from Ti, Cr, Cu, W, Ni, Ta, Ga, In, Al, Pb, Pt, Au, Ag, etc., or any of an alloy of Ti—Al, Al—Cu, Ti—N, Ni—Cr, etc., may be deposited as a single layer or a multilayer structure of two or more layers. Particularly, Au, Ti, W, Al, and Cu is preferable as metal. Also, the film thickness of the metal layer may be 1 nm or more and less than 10 μm.

The plural wireless sensors 26b thus configured are provided. Each of the wireless sensors 26b holds the ID of a corresponding portable display 20. The wireless sensors 26b use the same frequency in principle. However, in order to obtain different IDs with the same frequency, distance dimension d between the comb-shaped electrode 62a and 62b the wireless sensors 26b may be made different from each other to change a moving time of a surface acoustic wave between the comb-shaped electrode 62a and 62b. Since the moving time of a surface acoustic wave moving on the dielectric thin film 61 is very large as compared with the moving time of a radio wave signal between the transceiver 18b and the wireless sensor 26b, the ID is set in accordance with a propagation time t of a surface acoustic wave between the comb-shaped electrode 62a and 62b. It is advisable to previously store an ID setting table that associates the propagation times t and the IDs with each other, in storage (not shown) of the horizontal display 10, for example.

The basic operation of detecting an ID using the wireless sensor 26b is as follows:

First, the transceiver 18b transmits a sensor question signal having a frequency of 300 MHz. Upon reception of the sensor question signal, the wireless sensor 26b causes the dielectric thin film 61 to generate a surface acoustic wave and transmits a sensor answer signal. Then, the transceiver 18b receives the sensor answer signal, conducts an analysis process, and references the ID setting table based on the propagation time t calculated in the analysis process to read the ID.

On the other hand, the horizontal display 10 finds a distance to the portable display 20 based on an intensity of the radio wave received by the transceiver 18b from the wireless sensor 26b and calculates a position of the portable display 20 based on the distance. If plural transceivers 18b are provided, the position accuracy in the three-dimensional space is enhanced.

In the exemplary embodiment, the horizontal display 10 is used as an example of a display having a substantially horizontal display screen. It is assumed that the expression "substantially horizontal" does not require that the top plate 11 be completely parallel to the ground or floor face and may be horizontal to such an extent that the portable display 20 does not fall if the portable display 20 is placed on the top plate 11. Hereinafter, the case where the exemplary embodiment is applied to the horizontal display 10 will be described, but the exemplary embodiment may be applied to a display of any other type such as a vertical display.

In the exemplary embodiment, display as shown in FIGS. 7 and 8 is implemented using the horizontal display 10 described above. Here, a scene is assumed where participants in a conference carry their respective portable displays 20 into a conference room to have a conference while referencing a shared screen implemented on the horizontal display 10.

FIG. 7 is a drawing to show a first example of displaying an electronic document, which is displayed on the portable display 20, on the horizontal display 10.

Figure 7A:
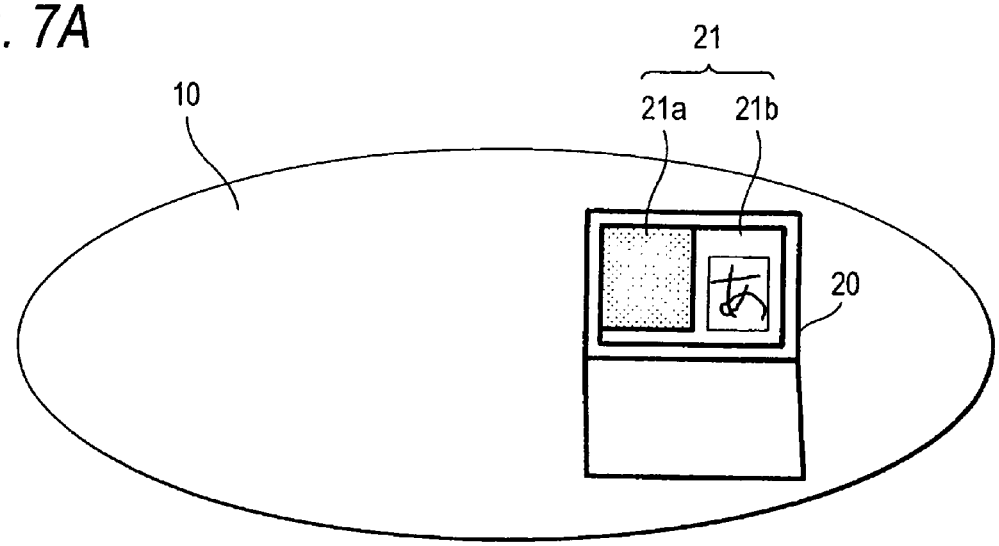
FIG. 7 is a drawing to show a first example of display implemented in the exemplary embodiment of the invention.

First, each participant places the portable display 20 on the horizontal display 10 and connects the portable display 20 to a predetermined line in the conference room, for example. Then, an area corresponding to the shared screen (shared area 21a) is displayed on a display screen 21 of the portable display 20 as shown in FIG. 7A. In the figure, the shared area 21a is shown as an area having a given area (shaded area) on the display screen 21, but may be a folder or the like, for example. On the other hand, any area other than the shared area 21a is a personal display area (personal area 21b) and an image of an electronic document not shared at this time is displayed.

Figure 7B:
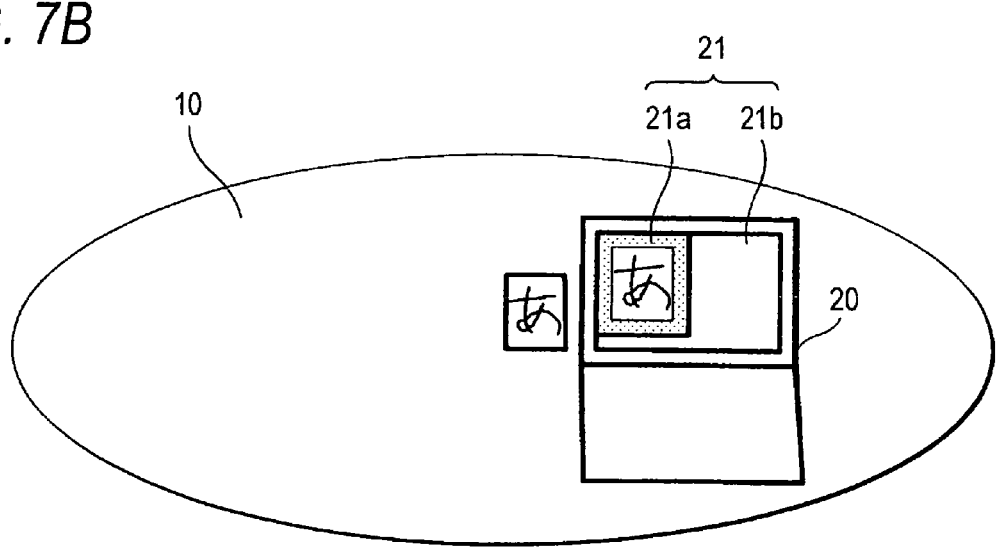

Next, the participant selects an image (one of images) of the electronic document displayed in the personal area 21b and moves it to the shared area 21a by a dragging operation, for example. Then, display on the horizontal display 10 and that on the portable display 20 becomes as shown in FIG. 7B. That is, the moved electronic document is displayed in the shared area 21a and the electronic document is called from a server, etc., and is displayed beside the portable display 20, for example, on the horizontal display 10.

In this example, the upper side of the image of the electronic document is displayed so as to become an opposite side to an operator of the portable display 20. Here, the upper side of the image refers to an upper side in the case where the image is placed in a predetermined orientation that is determined as a unique attribute to the image. The natural orientation when a human sees an image, for example, if the image contains text, an orientation in which a human can read the text may be adopted as the predetermined orientation as the unique attribute to the image. In so doing, if the upper side of the image becomes the opposite side to the operator of the portable display 20, it means that the image is displayed in the orientation easy to see for the operator of the portable display 20 on the horizontal display 10. However, as a method for displaying the image of the electronic document, any other display method may be adopted. For example, a scene is also possible where the participant who operates the portable display 20 explains while referencing the display screen 21 of the portable display 20 and any other participant receives the explanation while referencing the display on the horizontal display 10. In such a case, it is desirable that the image should be displayed in the orientation easy to see for the participators other than the operator of the portable display 20. That is, the image of the electronic document may be displayed in a state where the upper side of the image is oriented to a direction along which the display screen of the display screen 21 of the portable display 20 is usually viewed.

FIG. 8 is a drawing to show a second example of displaying an electronic document displayed on the portable display 20 on the horizontal display 10.

Figure 8A:
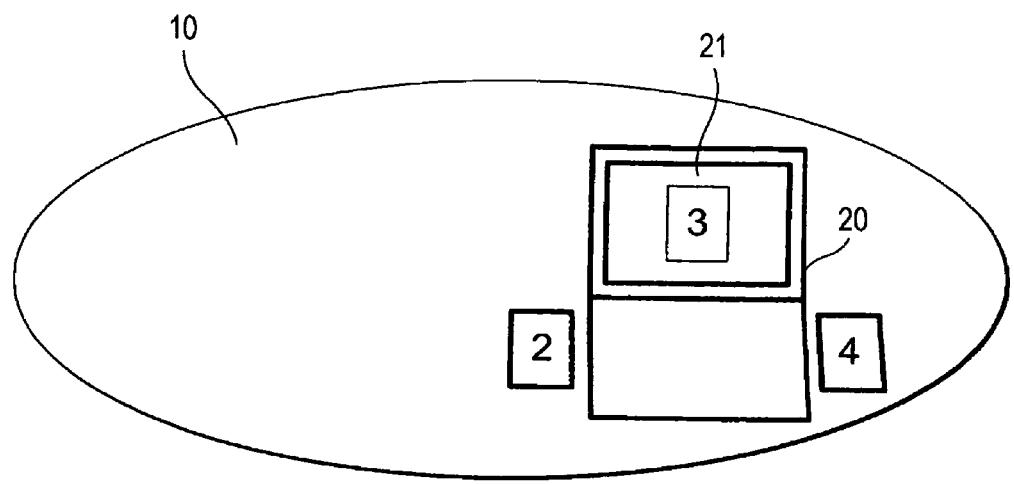
FIG. 8 is a drawing to show a second example of display implemented in the exemplary embodiment of the invention.

First, each participant places the portable display 20 on the horizontal display 10. At this time, it is assumed that a third page of an electronic document is displayed on the display screen 21 of the portable display 20. Then, on the horizontal display 10, a second page of the electronic document is displayed to the left of the portable display 20 and a fourth page of the electronic document is displayed to the right of the portable display 20 as shown in FIG. 8A.

Figure 8B:
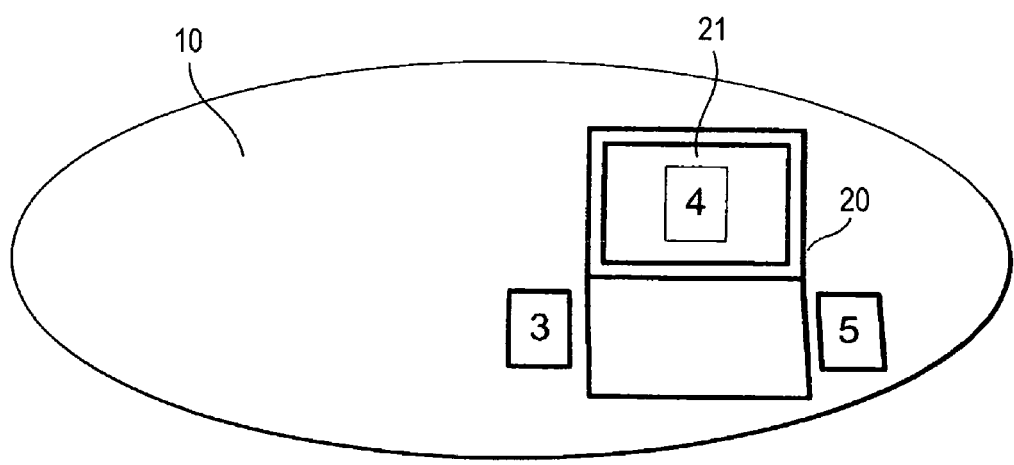

Next, whenever the participant performs operation of turning a page of the electronic document, information is transmitted to the horizontal display 10 and the display is updated. For example, if the fourth page of the electronic document is displayed on the portable display 20, the left image is updated to the third page and the right image is updated to a fifth page as shown in FIG. 8B.

Next, the configuration of a display system for implementing such schematic operation will be described.

The display system of the exemplary embodiment includes (i) the case where the horizontal display 10 recognizes the ID of the portable display 20 and the position of the portable display 20 on the horizontal display 10 as shown in FIGS. 1 and 5 and (ii) the case where the portable display 20 recognizes the ID of the horizontal display 10 and the position of the portable display 20 on the horizontal display 10 as shown in FIG. 3.

Then, the former case will be described as a first configuration example of the display system, and the latter case will be described as a second example of the display system.

Figure 9:
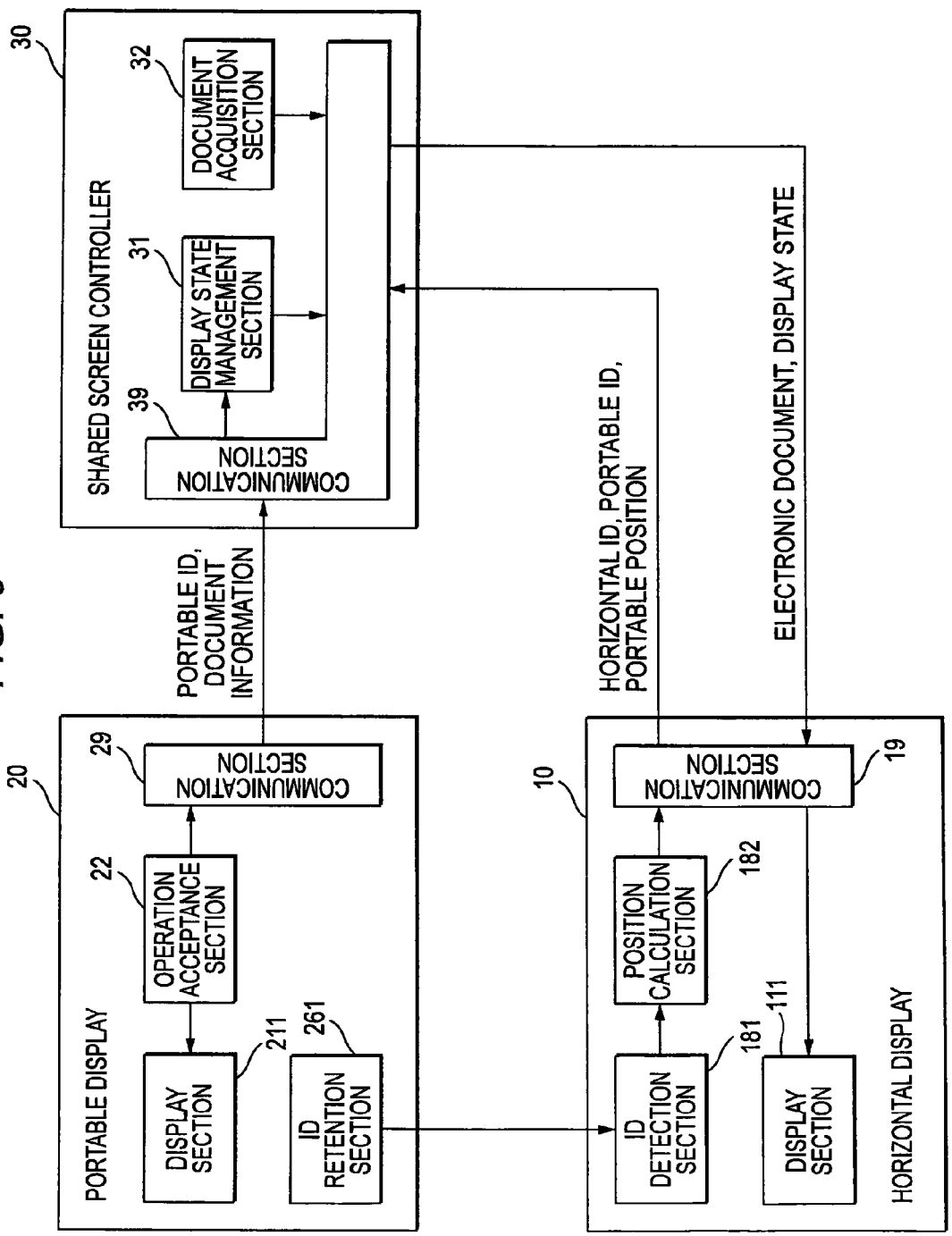
FIG. 9 is a drawing to show a first configuration example of a display system in the exemplary embodiment of the invention.

FIG. 9 is a drawing to show the first configuration example.

As shown in the figure, the first configuration example of the display system of the exemplary embodiment includes the horizontal display 10, the portable display 20, and a shared screen controller 30 for controlling the shared screen on the horizontal display 10 in accordance with information received from the portable display 20. If the horizontal display 10 includes the infrared light source 17 for irradiating with infrared light and the infrared camera 18a for receiving the infrared light reflected on the bottom surface of the portable display 20 as shown in FIG. 1, the code image 26a is put on the portable display 20. If the horizontal display 10 includes the transceiver 18b for conducting wireless communications as shown in FIG. 5, the wireless sensor 26b is attached to the portable display 20. The horizontal display 10 and the shared screen controller 30, and the portable display 20 and the shared screen controller 30 are connected by a LAN, for example. In the figure, one horizontal display 10 and one portable display 20 are connected to one shared screen controller 30, but plural horizontal displays 10 and plural portable displays may be connected to the shared screen controller 30.

In the exemplary embodiment, the horizontal display 10 is used as an example of a first apparatus and an example of a first display, and the top plate 11 (see FIGS. 1 and 5) is used as an example of a display screen of the first apparatus and an example of a first display screen. The portable display 20 is used as an example of a second apparatus and an example of a second display, and the display screen 21 (see FIGS. 7 and 8) is used as an example of a display screen of the second apparatus and an example of a second display screen. Further, the shared screen controller 30 is used as an example of a display control device and an example of a controller.

The internal functional configurations of the respective apparatus and units will be described.

The horizontal display 10 includes a display section 111 for performing an image display process, an ID detection section 181 for detecting the ID of the portable display 20 (which will be hereinafter referred to as a "portable ID"), a position calculation section 182 for calculating a position of the portable display 20 on the top plate 11 (which will be hereinafter referred to as a "portable position"), and a communication section 19 for transmitting and receiving information to and from the shared screen controller 30.

The display section 111 outputs an image to be projected onto the top plate 11 to the projector 15 in accordance with information concerning a display state received by the communication section 19 from the shared screen controller 30, for example, information concerning a display position and a display direction (orientation).

The ID detection section 181 analyzes an image captured by the infrared camera 18a or the information received by the transceiver 18b, thereby detecting the portable ID.

The position calculation section 182 analyzes the image captured by the infrared camera 18a or the information received by the transceiver 18b, thereby calculating the portable position.

The communication section 19 transmits an ID of the communication section 19, the portable ID, and the portable position to the shared screen controller 30 and receives an electronic document and the information concerning the display state in the display section 111 from the shared screen controller 30.

The portable display 20 includes a display section 211 for performing an image display process, an operation acceptance section 22 for accepting a user's operation for an image, an ID retention section 261 for retaining its portable ID, and a communication section 29 for transmitting and receiving information to and from the shared screen controller 30.

The display section 211 performs processes for displaying an electronic document and changing display contents of the electronic document in response to the user's operation and displays an image on the display screen 21 (see FIGS. 7 and 8).

The operation acceptance section 22 accepts the user's operation and transmits information concerning the user's operation to the display section 211 so as to produce display based on the user's operation. The operation acceptance section 22 also transmits the information concerning the user's operation to the communication section 29 so that the display in the horizontal display 10 is updated based on the user's operation.

The ID retention section 261 is implemented by putting the code image 26a on the bottom surface of the portable display 20 or attaching the wireless sensor 26b to the portable display 20. That is, in the exemplary embodiment, the code image 26a or information retained by the wireless sensor 26b is used as an example of information retained by the second apparatus.

The communication section 29 transmits an ID of the communication section 29 and information concerning the electronic document for which the user's operation accepted by the operation acceptance section 22 is performed (which will be hereinafter referred to as "document information") to the shared screen controller 30. The document information mentioned here may include information for uniquely identifying the electronic document (which will be hereinafter referred to as a "document ID") and page number in the electronic document.

The shared screen controller 30 includes a display state management section 31 for managing the display state of the horizontal display 10, a document acquisition section 32 for acquiring an electronic document to be displayed on the horizontal display 10, and a communication section 39 for transmitting and receiving information to and from the portable display 20 and the horizontal display 10.

The display state management section 31 keeps track of which portable display 20 is placed on which horizontal display 10. The display state management section 31 also keeps track of which position the portable display 20 is placed at. That is, in the exemplary embodiment, the function portion of the display state management section 31 is provided as an example of a position specifying unit for specifying the position of the second apparatus. Further, the display state management section 31 also keeps track of which orientation the placed portable display 20 is directed toward. That is, in the exemplary embodiment, the function portion of the display state management section 31 is provided as an example of an orientation specifying unit for specifying the orientation of the second apparatus. Further, the display state management section 31 also keeps track of an image of which electronic document is displayed on the display screen 21 of the portable display 20 (see FIGS. 7 and 8) and how the image has been changed. That is, in the exemplary embodiment, the function portion of the display state management section 31 is provided as an example of an image specifying unit for specifying the image and a recognition unit for recognizing change in the image.

If there is a request for newly displaying an electronic document or a page on the horizontal display 10, the document acquisition section 32 reads the electronic document or the page from a document server (not shown), the portable display 20, a memory (not shown) in the shared screen controller 30 in which the electronic document is previously stored, etc.

The communication section 39 receives the horizontal ID, the portable ID, the portable position from the horizontal display 10 and the portable ID and document information from the portable display 20. The communication section 39 also transmits the electronic document and the information concerning the display state to the horizontal display 10. That is, in the exemplary embodiment, the communication section 39 is provided as an example of a controller for controlling display.

Figure 10:
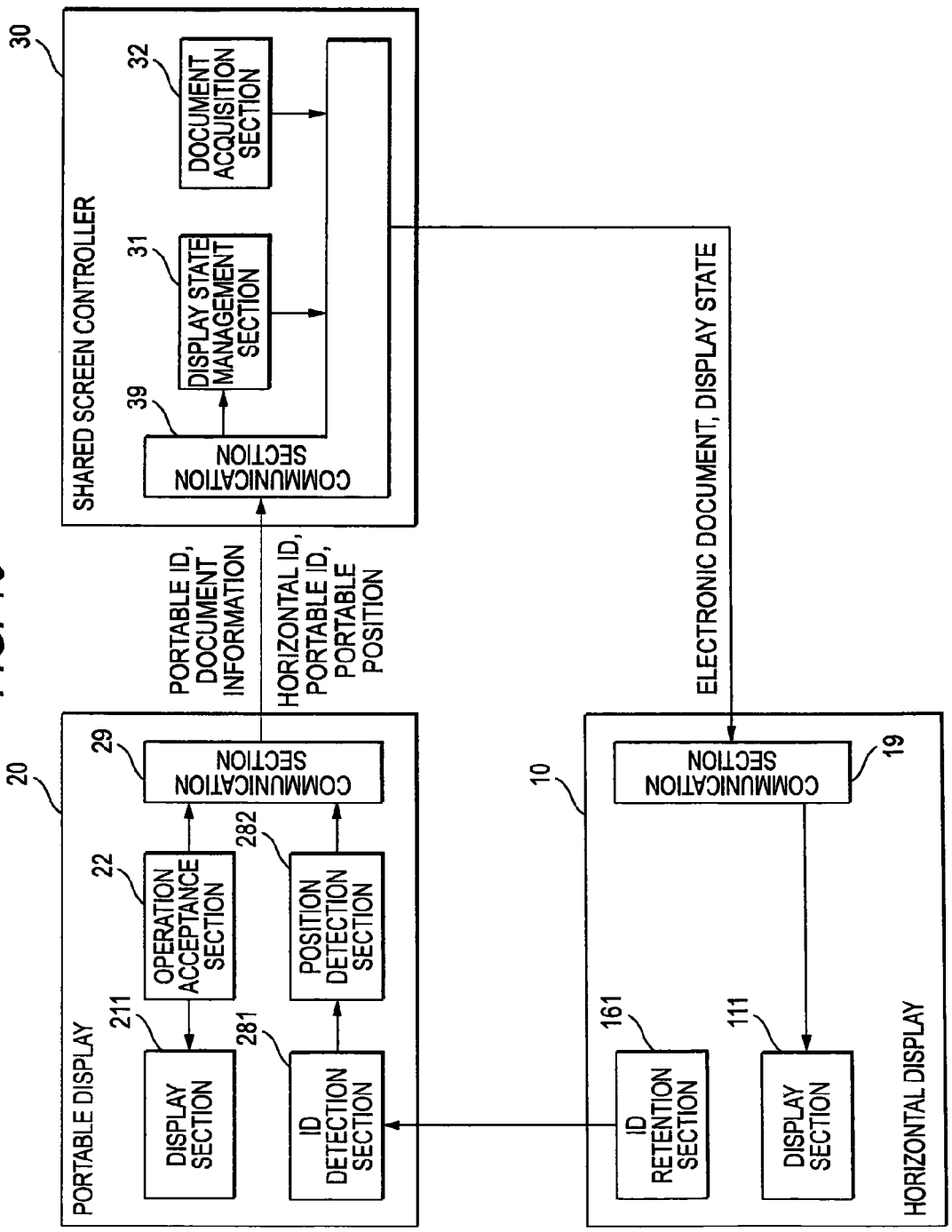
FIG. 10 is a drawing to show a second configuration example of the display system in the exemplary embodiment of the invention.

FIG. 10 is a drawing to show the second configuration example.

As shown in the figure, the second configuration example of the display system of the exemplary embodiment also includes the horizontal display 10, the portable display 20, and the shared screen controller 30 for controlling the shared screen on the horizontal display 10 in accordance with information received from the portable display 20. If the portable display 20 includes the infrared light source 27 for irradiating with infrared light and the infrared camera 28 for receiving infrared light reflected on the top plate 11 of the horizontal display 10 as shown in FIG. 3, the code image 16 is put on the horizontal display 10. Also in the configuration example, the horizontal display 10 and the shared screen controller 30, and the portable display 20 and the shared screen controller 30 are connected by a LAN, for example. In the figure, one horizontal display 10 and one portable display 20 are connected to one shared screen controller 30. However, plural horizontal displays 10 and plural portable displays 20 may be connected to the shared screen controller 30.

In the exemplary embodiment, the horizontal display 10 is used as an example of the first apparatus and an example of the first display, and the top plate 11 (see FIG. 3) is used as an example of the display screen of the first apparatus and an example of the first display screen. The portable display 20 is used as an example of the second apparatus and an example of the second display, and the display screen 21 (see FIGS. 7 and 8) is used as an example of the display screen of the second apparatus and an example of the second display screen. Further, the shared screen controller 30 is used as an example of the display control device and an example of the controller.

The internal functional configurations of the respective apparatus and units will be described.

The horizontal display 10 includes a display section 111 for performing an image display process, an ID retention section 161 for retaining the ID of the horizontal display 10 (which will be hereinafter referred to as a "horizontal ID"), and a communication section 19 for transmitting and receiving information to and from the shared screen controller 30.

The display section 111 outputs an image to be projected onto the top plate 11 to the projector 15 in accordance with information concerning a display state received by the communication section 19 from the shared screen controller 30, for example, information concerning a display position and a display direction (orientation).

The ID retention section 161 is implemented by putting the code image 16 on the surface of the top plate 11. That is, in the exemplary embodiment, information retained by the code image 16 is used as an example of information retained by the first apparatus.

The communication section 19 receives an electronic document and the information concerning the display state of the display section 111 from the shared screen controller 30.

The portable display 20 includes a display section 211 for performing an image display process, an operation acceptance section 22 for accepting a user's operation for an image, an ID detection section 281 for detecting the horizontal ID, a position detection section 282 for detecting a portable position that is a position of the portable display 20 itself on the horizontal display 10, and a communication section 29 for transmitting and receiving information to and from the shared screen controller 30.

The display section 211 performs processes for displaying an electronic document and changing display contents of the electronic document in accordance with the user's operation and displays an image on the display screen 21 (see FIGS. 7 and 8).

The operation acceptance section 22 accepts the user's operation and transmits information concerning the user's operation to the display section 211 so as to produce display based on the user's operation. Also, the operation acceptance section 22 transmits the information concerning the user's operation to the communication section 29 so that the display in the horizontal display 10 is updated based on the user's operation.

The ID detection section 281 analyzes an image captured by the infrared camera 28, thereby detecting the horizontal ID.

The position calculation section 282 analyzes the image captured by the infrared camera 28, thereby calculating the portable position.

The communication section 29 transmits the horizontal ID, the ID of the communication section 29, the portable position, and document information concerning the electronic document for which user's operation accepted by the operation acceptance section 22 is performed to the shared screen controller 30.

The shared screen controller 30 includes a display state management section 31 for managing the display state of the horizontal display 10, a document acquisition section 32 for acquiring an electronic document to be displayed on the horizontal display 10, and a communication section 39 for transmitting and receiving information to and from the portable display 20 and the horizontal display 10.

The display state management section 31 keeps track of which portable display 20 is placed on which horizontal display 10. The display state management section 31 also keeps track of which position the portable display 20 is placed at. That is, in the exemplary embodiment, the function portion of the display state management section 31 is provided as an example of a position specifying unit for specifying a position of the second apparatus. Further, the display state management section 31 also keeps track of which orientation the placed portable display 20 is directed toward. That is, in the exemplary embodiment, the function portion of the display state management section 31 is provided as an example of an orientation specifying unit for specifying an orientation of the second apparatus. Further, the display state management section 31 also keeps track of an image of which electronic document is displayed on the display screen 21 of the portable display 20 (see FIGS. 7 and 8) and how the image has been changed. That is, in the exemplary embodiment, the function portion of the display state management section 31 is provided as an example of an image specifying unit for specifying the image and a recognition unit for recognizing change in the image.

If there is a request for newly displaying an electronic document or page in the horizontal display 10, the document acquisition section 32 reads the electronic document or the page from a document server (not shown), the portable display 20, a memory (not shown) in the shared screen controller 30 in which the electronic document is previously stored, etc.

The communication section 39 receives the horizontal ID, the portable ID, the portable position and the document information from the portable display 20. The communication section 39 also transmits the electronic document and the information concerning the display state to the horizontal display 10. That is, in the exemplary embodiment, the communication section 39 is provided as an example of a controller for controlling display.

In the system configurations shown in FIGS. 9 and 10, the shared screen controller 30 is provided separately from the horizontal display 10, but may be provided integrally with the horizontal display 10. If such a configuration is adopted, it is not necessary to manage the horizontal ID in the management information.

Next, an operation of the display system of the exemplary embodiment is will described below.

In FIG. 9, first in the horizontal display 10, the ID detection section 181 detects the portable ID, the position calculation section 182 calculates the portable position, and the communication section 19 transmits these pieces of information (the portable ID and the portable position) together with the horizontal ID to the shared screen controller 30. In the portable display 20, the operation acceptance section 22 accepts a user's operation and the communication section 29 transmits the document information of the electronic document for which the user's operation is performed together with the portable ID to the shared screen controller 30.

In FIG. 10, in the portable display 20, the ID detection section 281 detects the horizontal ID, the position detection section 282 detects the portable position, and the communication section 29 transmits these pieces of information (the horizontal ID and the portable position) together with the portable ID to the shared screen controller 30. Similarly, in the portable display 20, the operation acceptance section 22 accepts a user's operation and the communication section 29 transmits the document information of the electronic document for which user's operation is performed together with the portable ID to the shared screen controller 30.

Accordingly, the operation of the shared screen controller 30 starts. Here, the operation for implementing the display in FIG. 7 and that in FIG. 8 will be described separately.

Figure 11:
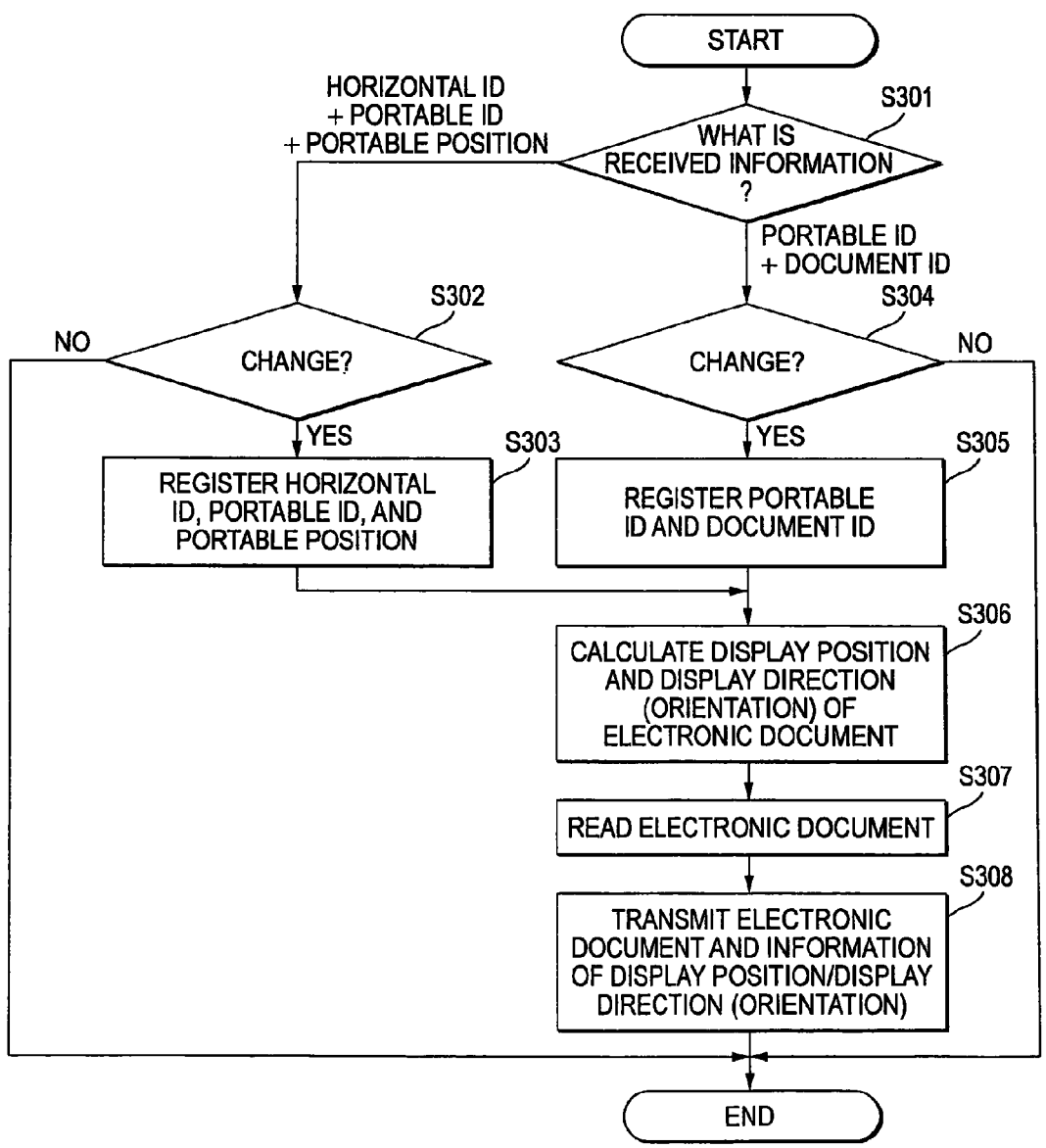
FIG. 11 is a flowchart to show a first operation example of the display system in the exemplary embodiment of the invention.

FIG. 11 is a flowchart to show the operation of the shared screen controller 30 to implement the display in FIG. 7.

The shared screen controller 30, first, determines as to which the communication section 39 receives either information containing the horizontal ID, the portable ID, and the portable position or information containing the portable ID and the document ID (step 301).

If it is determined that the communication section 39 receives the information containing the horizontal ID, the portable ID and the portable position, the received information is passed to the display state management section 31. If the system has the configuration shown in FIG. 9, the information is received from the horizontal display 10. If the system has the configuration shown in FIG. 10, the information is received from the portable display 20. The display state management section 31 determines as to whether or not association among the horizontal ID, the portable ID and the portable position changes (step 302). If change is not detected, the process is terminated. If change is detected, association among the received horizontal ID, the received portable ID, and the received portable position is registered (step 303).

If it is determined that the information containing the portable ID and the document ID is received, the received information is also passed to the display state management section 31. In this case, the information is received from the portable display 20 regardless of whether the system has the configuration shown in FIG. 9 or that shown in FIG. 10. The display state management section 31 determines as to whether or not association between the portable ID and the document ID changes (step 304). If change is not detected, the processing is terminated. If change is detected, association between the received portable ID and received the document ID is registered (step 305).

Following step 303 if it is determined at step 302 that change is detected or following step 305 if it is determined at step 304 that change is detected, the display state management section 31 calculates a display position and a display direction (orientation) of the electronic document on the horizontal display 10 (step 306). For example, in FIG. 7, a position beside the portable position received at step 301 is calculated as the display position.

The document acquisition section 32 reads the electronic document to be displayed (step 307). Here, it is not necessary that the electronic document to be displayed is the same as the electronic document for which the user's operation is performed in the portable display 20. For example, another electronic document previously associated with the electronic document for which the user's operation is performed may be selected as the electronic document to be displayed. In this case, an image of the other electronic document previously associated is an example of an image having a predetermined relationship. If the image having the predetermined relationship is thus selected, the display position and the display direction (orientation) calculated at step 306 may be set according to the predetermined relationship.

Then, the communication section 39 transmits information of the display position and the display direction (orientation) calculated at step 306 and the electronic document read at step 307 to the horizontal display 10 (step 308).

Accordingly, in the horizontal display 10, the image of the transmitted electronic document is displayed at the transmitted display position in the transmitted display direction (orientation).

Management information referenced and updated by the display state management section 31 in the process shown in FIG. 11 will be described. It is advisable to previously store the management information in a memory (not shown) that can be referenced by the display state management section 31.

Figures 12A, 12B:
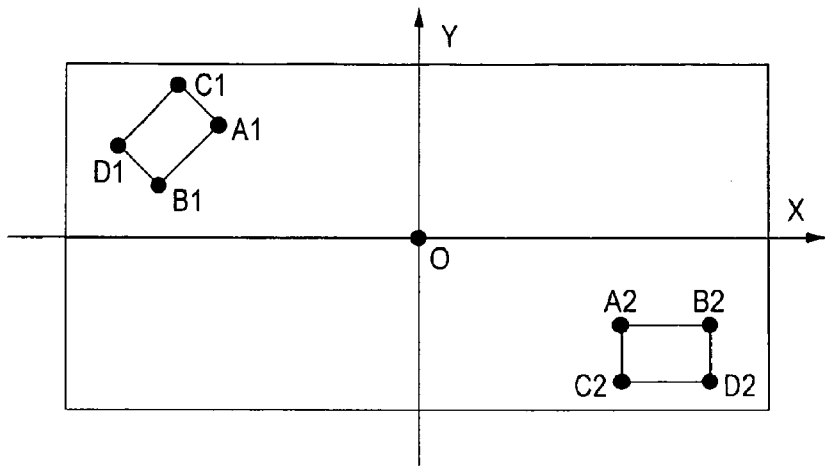
FIG. 12 is a drawing to show management information used in the first operation example.

Before the management information is described, first, coordinates on a screen of the horizontal display 10 will be described. FIG. 12A shows an example of the coordinates set on the screen. Here, the screen is rectangular and its center point is the origin. An X axis is taken in the longer direction and a Y axis is taken in the shorter direction.

On the screen, positions where the portable display 20 is placed are indicated by a quadrangle having A1, B1, C1, and D1 as vertexes and a quadrangle having A2, B2, C2, and D2 as vertexes. However, this is an example. Of points arranged like a lattice with short spacing, a point existing in an area where the portable display 20 is placed may be managed, for example.

FIG. 12B shows contents of the management information when the portable displays 20 are thus placed. It is assumed that FIG. 12A shows a state where the portable displays 20 are placed on the horizontal display 10 having a horizontal ID "P001" and that the horizontal display 10 having a horizontal ID "P002" is also managed separately from the horizontal display 10 having the horizontal ID "P001."

For the coordinates in the portable position column in FIG. 12 B, "x" is suffixed to a symbol assigned to a point in FIG. 12A, thereby representing an X coordinate of that point, and "y" is suffixed to a symbol assigned to a point in FIG. 12A, thereby representing a Y coordinate of that point. In this case, the portable display 20 is approximated to a rectangle and a range where the portable display 20 is placed is represented by coordinates of four vertexes. In order to indicate which orientation the portable display 20 is placed in on the screen, coordinates of three points of an upper left point, an upper right point and a lower left point are stored. Further, document IDs of electronic documents, for which user's operation is performed, among the electronic documents displayed on the portable displays 20 are also stored in the management information.

At step 302 in FIG. 11, it is determined as to whether or not association among the horizontal ID, the portable ID, and the portable position changes in the management information shown in FIG. 12B. If it is determined that change is detected, the already registered association is changed to new association at step 303. At step 304 in FIG. 11, it is determined as to whether or not association between the portable ID and the document ID changes in the management information shown in FIG. 12B. If it is determined that change is detected, the already registered association is changed to new association at step 305.

FIG. 13 is a flowchart to show the operation of the shared screen controller 30 to implement the display in FIG. 8.

In the shared screen controller 30, first it is determined which the communication section 39 receives either information including the horizontal ID, the portable ID, and the portable position or information including the portable ID, the document ID, and the page number (step 351).

If it is determined that the information including the horizontal ID, the portable ID, and the portable position is received, the received information is passed to the display state management section 31. If the system has the configuration shown in FIG. 9, the information is received from the horizontal display 10. If the system has the configuration shown in FIG. 10, the information is received from the portable display 20. The display state management section 31 determines as to whether or not association among the horizontal ID, the portable ID, and the portable position changes (step 352). If change is not detected, the process is terminated. If change is detected, the association among the received horizontal ID, the received portable ID and the received portable position is registered (step 353).

If it is determined that the information including the portable ID, the document ID, and the page number is received, the received information is also passed to the display state management section 31. In this case, the information is received from the portable display 20 regardless of either the system configuration is that shown in FIG. 9 or 10. Then, the display state management section 31 determines as to whether or not association among the portable ID, the document ID, and the page number changes (step 354). If change is not detected, the process is terminated. If change is detected, the association among the received portable ID, the received document ID and the received page number is registered (step 355).

Following step 353 if it is determined at step 352 that change is detected or following step 355 if it is determined at step 354 that change is detected, the display state management section 31 calculates display positions and a display direction (orientation) of pages preceding and following the page of the electronic document displayed on the portable display 20 placed on the horizontal display 10 (step 356). For example, in FIG. 8, positions to the left and the right of the portable position received at step 351 are calculated as the display positions.

The document acquisition section 32 reads the pages preceding and following the page displayed on the portable display 20 as pages to be displayed (step 357). However, it is not necessary that the pages to be displayed are the pages preceding and following the displayed page. For example, any other page previously associated with the page displayed on the portable display 20 may be selected as the page to be displayed. Alternatively, the display control on the horizontal display 10 may be performed in other units than the page units. For example, among image data in one folder, image data created just before and image data created just after the image data displayed on the portable display 20 in the time sequence may be read as the data to be displayed. That is, in the exemplary embodiment, an image of the preceding page and an image of the following page are used as an example of the two images preceding and following in a predetermined order relation. The positions to the left and the right of the portable display 20 are used as an example of the two symmetrical positions with the position of second apparatus as a center.

Then, the communication section 39 transmits information of the display positions and the display directions (orientations) calculated at step 356 and the pages read at step 357 to the horizontal display 10 (step 358).

Accordingly, in the horizontal display 10, the transmitted pages are displayed at the transmitted display positions in the transmitted display direction (orientation).

Management information referenced and updated by the display state management section 31 in the process shown in FIG. 13 will be described. It is advisable to previously store the management information in a memory (not shown) that can be referenced by the display state management section 31.

Also in the management information, it is assumed that coordinates are represented in the same manner as those previously described with reference to FIG. 12A and the portable displays 20 are placed as in FIG. 12A.

FIG. 14 shows contents of the management information when the portable displays 20 are thus placed. Here, it is assumed that the horizontal display 10 having a horizontal ID "P002" is also managed separately from the horizontal display 10 having a horizontal ID "P001" shown in FIG. 12A. Document IDs and pages of electronic documents for which a user's operation is performed among the electronic documents displayed on the portable displays 20 are also stored in the management information.

At step 352 in FIG. 13, it is determined as to whether or not the association among the horizontal ID, the portable ID and the portable position changes in the management information in FIG. 14. If it is determined that change is detected, the already registered association is changed to new association at step 353. At step 354 in FIG. 13, it is determined as to whether or not the association among the portable ID, the document ID and the page number changes in the management information in FIG. 14. If it is determined that change is detected, the already registered association is changed to new association at step 355.

Last, to implement the exemplary embodiment as a computer 90, the hardware configuration of the computer 90 will be described.

Figure 15:
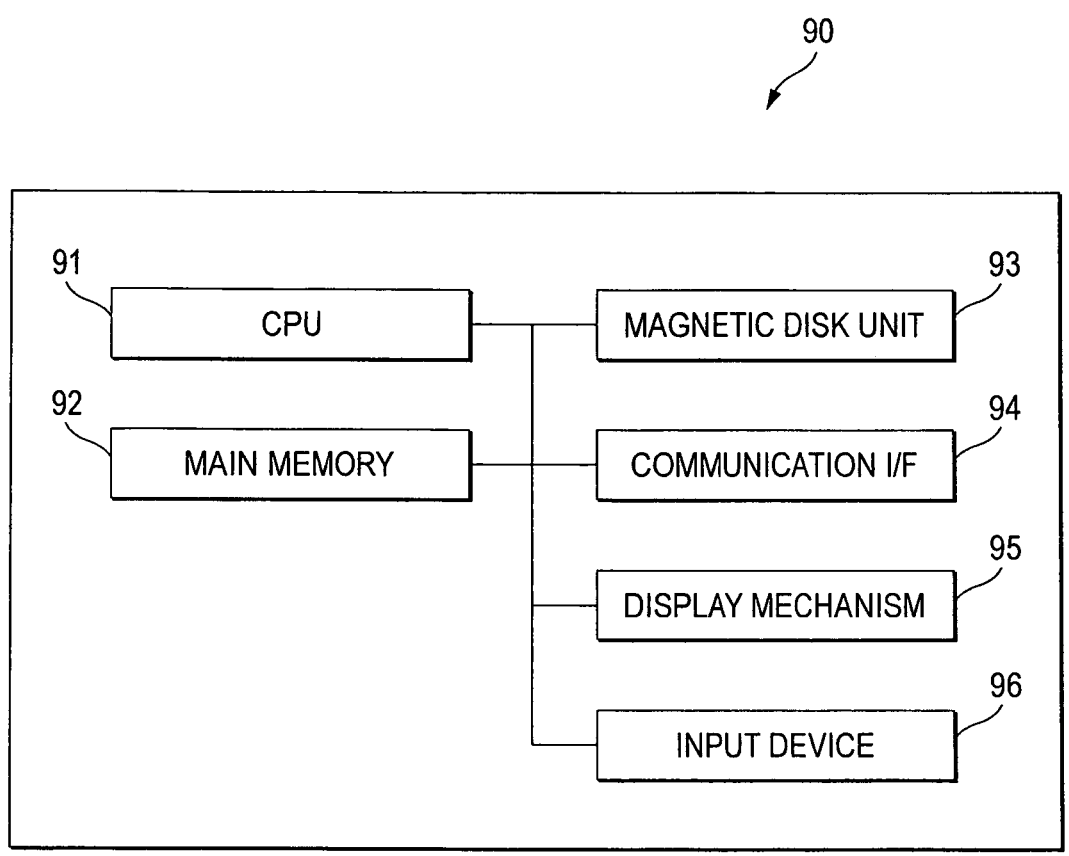
FIG. 15 is a diagram to show the hardware configuration of a computer that can implement the exemplary embodiment of the invention.

FIG. 15 is a diagram to show the hardware configuration of the computer 90.

As shown in the figure, the computer 90 includes a CPU (Central Processing Unit) 91 of computation means and main memory 92 and a magnetic disk unit (HDD: Hard Disk Drive) 93 of storage means. The CPU 91 executes various types of software of OS (Operating System), applications, etc., for implementing the functions described above. The main memory 92 is a storage area for storing various types of software, data used for execution of the software, and the like, and the magnetic disk unit 93 is a storage area for storing input data to various types of software, output data from various types of software, and the like.

Further, the computer 90 includes a communication I/F 94 for conducting external communications, a display mechanism 95 made up of video memory, a display, etc., and input devices 96 of a keyboard, a mouse, etc.

The program for implementing the exemplary embodiment can be provided not only through communication means, but also as a computer-readable recording (storage) medium such as a CD-ROM storing the program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

FIG. 2
  A. SYNCHRONOUS CODE
  B. IDENTIFICATION CODE
FIG. 4
  A. SYNCHRONOUS CODE
  B. X POSITION CODE
  C. Y POSITION CODE
  D. IDENTIFICATION CODE
FIG. 9
  10 HORIZONTAL DISPLAY
  19 COMMUNICATION SECTION
  20 PORTABLE DISPLAY
  22 OPERATION ACCEPTANCE SECTION
  29 COMMUNICATION SECTION
  30 SHARED SCREEN CONTROLLER
  31 DISPLAY STATE MANAGEMENT SECTION
  32 DOCUMENT ACQUISITION SECTION
  39 COMMUNICATION SECTION
  111 DISPLAY SECTION
  181 ID DETECTION SECTION
  182 POSITION CALCULATION SECTION
  211 DISPLAY SECTION
  261 ID RETENTION SECTION
  A. PORTABLE ID, DOCUMENT INFORMATION
  B. HORIZONTAL ID, PORTABLE ID, PORTABLE POSITION
  C. ELECTRONIC DOCUMENT, DISPLAY STATE
FIG. 10
  10 HORIZONTAL DISPLAY
  19 COMMUNICATION SECTION
  20 PORTABLE DISPLAY
  22 OPERATION ACCEPTANCE SECTION
  29 COMMUNICATION SECTION
  30 SHARED SCREEN CONTROLLER
  31 DISPLAY STATE MANAGEMENT SECTION
  32 DOCUMENT ACQUISITION SECTION
  39 COMMUNICATION SECTION
  111 DISPLAY SECTION
  161 ID RETENTION SECTION
  211 DISPLAY SECTION
  281 ID DETECTION SECTION
  282 POSITION DETECTION SECTION
  A. PORTABLE ID, DOCUMENT INFORMATION
  B. HORIZONTAL ID, PORTABLE ID, PORTABLE POSITION
  C. ELECTRONIC DOCUMENT, DISPLAY STATE
FIG. 11
  S301 WHAT IS RECEIVED INFORMATION?
  A. HORIZONTAL ID+PORTABLE ID+PORTABLE POSITION
  B. PORTABLE ID+DOCUMENT ID
  S302 CHANGE?
  S303 REGISTER HORIZONTAL ID, PORTABLE ID, AND PORTABLE POSITION
  S304 CHANGE?
  S305 REGISTER PORTABLE ID AND DOCUMENT ID
  S306 CALCULATE DISPLAY POSITION AND DISPLAY DIRECTION (ORIENTATION) OF ELECTRONIC DOCUMENT
  S307 READ ELECTRONIC DOCUMENT
  S308 TRANSMIT ELECTRONIC DOCUMENT AND INFORMATION OF DISPLAY POSITION/DISPLAY DIRECTION (ORIENTATION)
FIG. 12
  A. HORIZONTAL ID
  B. PORTABLE ID
  C. PORTABLE POSITION
  D. DOCUMENT ID
FIG. 13
  S351 WHAT IS RECEIVED INFORMATION?
  A. HORIZONTAL ID+PORTABLE ID+PORTABLE POSITION
  B. PORTABLE ID+DOCUMENT INFORMATION
  S352 CHANGE?
  S353 REGISTER HORIZONTAL ID, PORTABLE ID, AND PORTABLE POSITION
  S354 CHANGE?
  S355 REGISTER PORTABLE ID, DOCUMENT ID, AND PAGE NUMBER
  S356 CALCULATE DISPLAY POSITIONS AND DISPLAY DIRECTIONS (ORIENTATIONS) OF PRECEDING AND FOLLOWING PAGES
  S357 READ PRECEDING AND FOLLOWING PAGES
  S358 TRANSMIT PRECEDING AND FOLLOWING PAGES AND INFORMATION OF DISPLAY POSITIONS AND DISPLAY DIRECTIONS (ORIENTATIONS)
FIG. 14
  A. HORIZONTAL ID
  B. PORTABLE ID
  C. PORTABLE POSITION
  D. DOCUMENT ID

FIG. 15
- 92 MAIN MEMORY
- 93 MAGNETIC DISK UNIT
- 94 COMMUNICATION I/F
- 95 DISPLAY MECHANISM
- 96 INPUT DEVICE

What is claimed is:

1. A display control device for a first display screen of a first display apparatus and a second display screen of a second display apparatus, comprising:
   a position specifying unit that specifies a position of the second display apparatus placed on the first display screen of the first display apparatus to determine the position of the certain image displayed on the first display screen;
   an image specifying unit that specifies an image stored on the second display apparatus and displayed on the second display screen of the second display apparatus; and
   a controller that controls such that a certain image according to the image specified by the image specifying unit is displayed at a certain position on the first display screen of the first display apparatus, wherein
   the second display screen of the second display apparatus includes a shared area and a personal area, and
   if the image specified by the image specifying unit and displayed in the personal area moves to the shared area, the certain image according to the moved image is displayed at the certain position on the first display screen while displaying the moved image in the shared area.

2. The display control device according to claim 1, wherein
   the image specifying unit specifies the image displayed on the second display screen of the second display apparatus, and
   the certain image is the same image as the image specified by the image specifying unit.

3. The display control device according to claim 1, wherein
   the image specifying unit specifies the image that is designated from among two or more images displayed on the second display screen of the second display apparatus, and
   the certain image is different from the image specified by the image specifying unit.

4. The display control device according to claim 1, wherein
   the controller controls such that the certain image is displayed in a state where an upper side of the certain image is oriented to a direction along which the second display screen of the second display apparatus is usually viewed.

5. The display control device according to claim 1, wherein
   the certain image is an image having a predetermined first relationship with the image specified by the image specifying unit, and
   the certain position is a position having a second relationship in arrangement, according to the predetermined first relationship, with the position of the second display apparatus specified by the position specifying unit.

6. The display control device according to claim 1, wherein
   the certain image includes two images preceding and following the image specified by the image specifying unit in a predetermined sequence relationship, and
   the certain position includes two positions that are symmetrical with the position of the second display apparatus specified by the position specifying unit as a center.

7. The display control device according to claim 1, further comprising:
   an orientation specifying unit that specifies an orientation of the second display apparatus on the first display screen of the first display apparatus, wherein
   the controller controls such that the certain image is displayed in accordance with the orientation of the second display apparatus specified by the orientation specifying unit.

8. The display control device according to claim 1, wherein the position specifying unit specifies the position of the second display apparatus based on information that is acquired when the first display apparatus acquires information retained by the second display apparatus.

9. The display control device according to claim 1, wherein the position specifying unit specifies the position of the second display apparatus based on information that is acquired when the second display apparatus acquires information retained by the first display apparatus.

10. The display control device according to claim 1, further comprising:
    a recognition unit that recognizes change in the image displayed on the second display screen of the second display apparatus, wherein
    the controller controls such that the certain image, according to an image displayed on the second display screen of the second display apparatus after the change recognized by the recognition unit is made, is displayed at the certain position on the first display screen of the first display apparatus.

11. The display control device according to claim 1, wherein the position specifying unit determines the position and an identification of the second display apparatus by capturing a code image.

12. The display control device according to claim 1, wherein
    the second display screen of the second display apparatus placed on the first display apparatus includes a shared area and a personal area, and
    if an image displayed in the personal area moves to the shared area, the image displayed in the personal area is displayed on the first display screen of the first display apparatus as the certain image and is displayed in the shared area.

13. The display control device according to claim 1, wherein
    the certain image is displayed in a state where an upper side of the certain image is oriented in a direction parallel to an upper edge of the second display screen of the second display apparatus.

14. The display control device according to claim 1, wherein
    the certain image displayed on the first display screen and the moved image displayed on the second display screen have the same content.

15. The display control device according to claim 1, wherein: the position specifying unit specifies the position and an identification of the second display apparatus placed on the first display screen of the first display apparatus by capturing a tangible code image formed on a bottom surface of the second display apparatus.

* * * * *